(12) United States Patent
Peletz (10) Patent No.: US 12,368,721 B2
(45) Date of Patent: Jul. 22, 2025

(54) AUTO ACCOUNT PROVISIONING IN A CLOUD-BASED WIRELESS NETWORK

(71) Applicant: DISH Wireless L.L.C., Englewood, CO (US)

(72) Inventor: Brian Peletz, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 287 days.

(21) Appl. No.: 18/300,884

(22) Filed: Apr. 14, 2023

(65) Prior Publication Data

US 2023/0336563 A1 Oct. 19, 2023

Related U.S. Application Data

(60) Provisional application No. 63/331,171, filed on Apr. 14, 2022.

(51) Int. Cl.
*H04L 9/40* (2022.01)
*H04L 29/06* (2006.01)
*H04L 29/08* (2006.01)

(52) U.S. Cl.
CPC ................................ *H04L 63/104* (2013.01)

(58) Field of Classification Search
CPC .. H04L 63/105; H04L 63/0838; H04L 63/102
USPC ............................................................ 726/4
See application file for complete search history.

(56) References Cited

U.S. PATENT DOCUMENTS

| | | | |
|---|---|---|---|
| 8,578,452 B2* | 11/2013 | Lu | G06F 21/45 726/8 |
| 10,187,745 B1* | 1/2019 | Zhao | H04W 4/021 |
| 10,614,241 B1* | 4/2020 | Kirby | G06F 16/13 |
| 10,949,080 B2* | 3/2021 | Hosier, Jr. | G06F 3/04847 |
| 11,153,293 B1* | 10/2021 | Fan | H04L 63/101 |
| 11,463,576 B1* | 10/2022 | Gordon | G06F 3/0482 |
| 11,546,341 B2* | 1/2023 | Fuhry | G06F 21/602 |
| 2015/0269151 A1* | 9/2015 | Wallace | H04L 67/1085 705/314 |
| 2020/0014816 A1* | 1/2020 | Speasl | H04N 1/00129 |
| 2020/0117442 A1* | 4/2020 | Robertson | G06F 11/2033 |
| 2020/0336489 A1* | 10/2020 | Wuest | G06F 21/45 |
| 2021/0075794 A1* | 3/2021 | Gazit | H04L 63/1408 |
| 2021/0279349 A1* | 9/2021 | Martino | G06F 21/6227 |
| 2021/0357302 A1* | 11/2021 | Hoffnung | G06F 11/3428 |
| 2022/0012256 A1* | 1/2022 | Robertson | G06F 16/2358 |
| 2022/0029886 A1* | 1/2022 | Hameiri | H04L 41/0856 |
| 2022/0293254 A1* | 9/2022 | Reynolds | G06F 3/04842 |

FOREIGN PATENT DOCUMENTS

TW         I663556 B   *  6/2019

* cited by examiner

*Primary Examiner* — Haresh N Patel
(74) *Attorney, Agent, or Firm* — KW Law, LLP (57) ABSTRACT

An automated process for managing groups in a cloud-based environment receives a request to create a permission group. The permission group is built in a directory system, wherein the directory system is nonnative to the cloud-based environment. The permission group from the directory system is synced with an identity management system that is nonnative to the cloud-based environment. The process includes stashing a group creation job to a queue, wherein the group creation job is configured to create the group in the cloud-based environment. The system provisions the permission group in response to consuming the group creation job from the queue.

20 Claims, 10 Drawing Sheets

AUTO ACCOUNT PROVISIONING IN A CLOUD-BASED WIRELESS NETWORK

CROSS-REFERENCE TO RELATED APPLICATIONS

This application claims priority to U.S. Provisional Patent Application No. 63/331,171 filed on Apr. 14, 2022, and entitled "AUTO ACCOUNT PROVISIONING," which is incorporated herein by reference.

TECHNICAL FIELD

The following discussion generally relates to account provisioning, and in particular, to automatically provisioning user accounts in a cloud-based 5G network.

BACKGROUND

Wireless networks that transport digital data and telephone calls are becoming increasingly sophisticated. Currently, fifth generation (5G) broadband cellular networks are being deployed around the world. These 5G networks use emerging technologies to support data and voice communications with millions, if not billions, of mobile phones, computers and other devices. 5G technologies are capable of supplying much greater bandwidths than was previously available, so it is likely that the widespread deployment of 5G networks could radically expand the number of services offered to customers. This expansion will accompany an increased need for cybersecurity.

The process of provisioning user accounts has become increasingly important in today's digital age, as more and more services move online and require user authentication as a security measure. Provisioning refers to the process of creating and configuring a user account, which typically involves creating a user an account and assigning a password. Traditional methods of provisioning user accounts are manual and time-consuming. Such methods often require manual action by an administrator to create and configure each account with permissions. This approach can be error prone, particularly in large organizations where thousands of user accounts may need to be provisioned and deprovisioned. Such techniques are subject to human error and place a large workload on administrators.

Some organizations have attempted to address the foregoing issues using workflow tools. However, the workflow tools typically require human intervention. Although workflows may reduce the likelihood of human error, they typically do not eliminate the risk. Workload on administrators managing account workflows remains high, as the administrators typically perform the manual step of provisioning or deprovisioning user accounts.

Even using typical workflow tools, user account generation can take hours or even days in large cloud-based environments where human intervention is a gate in the workflow. Time requirements can stem from approval steps, from diagnosing the permissions an account needs, or from slow infrastructure, for example. Changing permissions or moving user accounts between permission groups can cause deletion and recreation of user accounts, which can trigger recreation and provisioning of a new account. A need exists for a provisioning system that is fast and reduces errors.

SUMMARY

Systems, methods, and devices of the present disclosure can manage automatic provisioning and deprovisioning of access permissions, permission groups, and user accounts in a cloud-based telephone network. An example of an automated process for managing groups in a cloud-based environment receives a request to create a permission group. The permission group is built in a directory system that is nonnative to the cloud-based environment. The permission group from the directory system is synced with an identity management system that is nonnative to the cloud-based environment. The process includes stashing a group creation job to a queue, wherein the group creation job is configured to create the group in the cloud-based environment. The system provisions the permission group in response to consuming the group creation job from the queue.

Various embodiments include the steps of receiving a second request to create a second permission group, and of provisioning the second permission group in response to the second permission group existing in the cloud-based environment before receiving the second request. Some embodiments receive a request to update the permission group, store a new state of the permission group in a data store, and send a message to a message queue indicating the new state of the permission group is in the data store. The permission group is updated to the new state in response to consuming the message from the message queue. A request is received to delete the permission group, and the permission group is deleted from the directory system. The deletion of the permission group is synced to the identity management system. The process can include writing a message to a queue to delete the permission group on the cloud-based environment. The permission group can be deleted from the cloud-based environment in response to consuming the message from the queue. An account can be provisioned with permissions assigned to the permission group in response to placing the account in the permission group. Old permissions associated with an old permission group are deprovisioned from the account in response to the account being removed from the permission group. The process updates an account in the identity management system in response to the account being placed in the permission group, stores permission data in a data store in response to the update in the identity management system, and moves the account in the cloud-based environment using the permission data read from the data store. The permission may enable access to a virtual central unit of a telephone network on the cloud-based environment. The permission may also enable access to a radio unit in communication with a telephone network running on the cloud-based environment.

Another example of a permission management system for a cloud-based telephone network includes a processor and a non-transitory memory in communication with the processor and configured to store instructions that, when executed by the processor, cause the permission management system to perform operations. The operations can include building a permission group in a directory system. The permission group is synced from the directory system with an identity management system. A group creation job is stashed to a queue. The permission group is provisioned in a telephone network on a cloud-based environment in response to consuming the group creation job from the queue. The directory system can be nonnative to the cloud-based environment, and the identity management system can be nonnative to the cloud-based environment.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the illustrations.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Systems and methods of the present disclosure implement multiple technologies to enforce access permissions in a cloud-based environment with enhanced flexibility. The system runs event-based workflows to take actions in response to requests. The system can be built on cloud-based infrastructure such as, for example, AWS® with custom integration with supporting directory systems (e.g., Active Directory®) and identity management systems (e.g., Okta®) that are non-native to the cloud-based infrastructure. Queues synchronize the native tools that use linear execution with the supporting nonnative services. The systems integrate into the cloud platform by performing various tasks outside the scope of native tools of the cloud-based platform, then communicating to the native platform using an application programming interface (API), or other techniques for communicating between applications.

Figure 1:
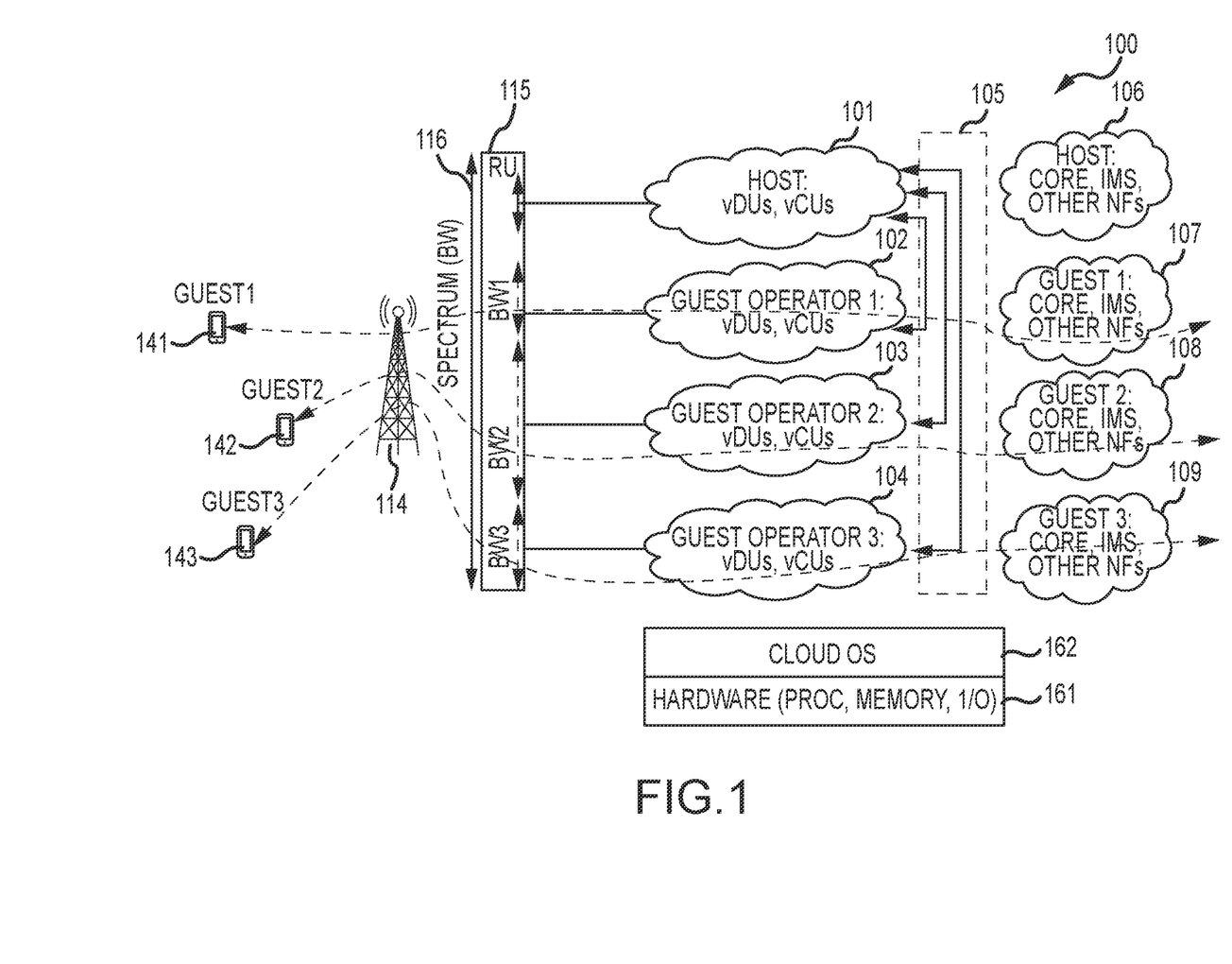
FIG. 1 illustrates an example of a 5G data and telephone network using cloud-based network functions, in accordance with various embodiments.

With reference now to FIG. 1, an example of a cellular communication system 100 is shown, in accordance with various embodiments. Cellular communication system 100 is implemented on cloud-based infrastructure to facilitate dynamic network adaptations. Cellular communication system 100 includes a host operator maintaining ownership of one or more radio units (RUs) 115 associated with a wireless network cell. The example of FIG. 1 depicts a host operator operating a "radio/spectrum as a service (R/SaaS)" that allocates bandwidth on its own radio units for use by one or more guest network operators, though the systems, methods, and devices described herein could be applied to any wireless network using virtualized network services. Examples of guest network operators may include internal brands of the host operator, system integrators, enterprises, external mobile virtual network operators (MVNOs), or converged operators. The host and the guest network operators may maintain desired network services to support user equipment (UE) 141, 142, 143.

The host and MVNOs may have their own user accounts and permission groups for various roles within cellular communication system 100. User accounts may be provisioned and deprovisioned frequently as virtualized assets come online and go offline. Human users associated with the entities operating cellular communication system 100 typically have accounts and group permissions that should change as the role of human users evolves and changes. Stagnant permissions on user groups tend to result in permission drift, with users having greater access than necessary. System accounts can be frequently provisioned and deprovisioned in response to expansion and contraction of cloud-based network infrastructure.

In the example of FIG. 1, each RU 115 communicates with UE 141, 142, 143 operating within a geographic area using one or more antennas 114 (also referred to herein as towers) capable of transmitting and receiving messages within an assigned spectrum 116 of electromagnetic bandwidth. In various embodiments, guest networks 102, 103, 104 interact with a provisioning plane 105 to obtain desired spectrum 116 across one or more of the RUs 115 operated by the host 101. Provisioning plane 105 allows guest network operators to obtain or change their assigned bandwidths on different RUs 115 on an on-demand and dynamic basis. Network services 107, 108, 109 may be maintained by guest operators, and network services 106 may be maintained by host 101. Network services and corresponding user accounts may be scaled up and down in response to network load, and permission management for user accounts within the system are provisioned and deprovisioned as described herein.

The Open RAN standard breaks communications into three main domains: the radio unit (RU) that handles radio frequency (RF) and lower physical layer functions of the radio protocol stack, including beamforming; the distributed unit (DU) that handles higher physical access layer, media access (MAC) layer, and radio link control (RLC) functions; and the centralized unit (CU) that performs higher level functions, including quality of service (QoS) routing and the like. The CU also supports packet data convergence protocol (PDCP), service data adaptation protocol (SDAP), and radio resource controller (RRC) functions. The RU, DU, and CU functions are described in more detail in the Open RAN standards, as updated from time to time, and may be modified as desired to implement the various functions and features described herein. In the example of FIG. 1, host 101 maintains one or more DUs and CUs (i.e., network functions) as part of its own network. The DU communicates with one or more RUs 115, as specified in the Open RAN standard.

The various network components shown in FIG. 1 are typically implemented using software or firmware instructions that are stored in a non-transitory data storage (e.g., a disk drive or solid-state memory) for execution by one or more processors. The various components shown in FIG. 1 can be implemented using computing hardware 161 and an appropriate operating system 162 such as the Amazon® Web Service (AWS) platform offered by Amazon Inc., although other embodiments could use other cloud platforms or any type of conventional physical computing hardware 161, as desired.

As illustrated in the example of FIG. 1, system 100 includes a host network 101 and one or more guest networks 102, 103, 104. The host network 101 is typically operated by an organization that owns radio equipment and sufficient spectrum (potentially on different bands) to offer 5G capacity and coverage. Host network 101 provides 5G service to connected UEs, and it manages network services available to its own UEs or those of its guest operators. Host network 101 includes at least one DU and at least one CU, both of which will typically be implemented as virtual computing units using cloud resources. Virtual DUs and virtual CUs, for example, are associated with user accounts and group permissions that manage access.

Guest networks 102, 103, 104 operated by guest operators can manage their own networks using allocated portions of spectrum 116 handled by one or more of the RUs 115 associated with the host 101. The guest networks 102, 103, 104 communicate with one or more UEs 141-143 using allocated spectrum 116 (e.g., bandwidth) on the host's RU 115. Guest networks 102, 103, 104 may include one or more virtual DUs and CUs, as well as other network services 106, 107, 108, 109 variously associated with user accounts and group permissions, as desired. Generally, one or more guest operators will instantiate its own 5G virtualized network functions (e.g., CMS, vCUs, vDUs, etc.) using cloud-based resources, as noted above. However, various embodiments may operate outside of cloud-based environments.

Each RU 115 is typically associated with a different wireless cell that provides wireless data communications to user devices 141-143. RUs 115 may be implemented with radios, filters, amplifiers, and other telecommunications hardware to transmit digital data streams via one or more antennas 114. Generally, RU hardware includes one or more processors, non-transitory data storage (e.g., a hard drive or solid-state memory), and appropriate interfaces to perform the various functions described herein. RUs are physically located on-site with antenna 114, as appropriate. Conventional 5G networks may make use of any number of wireless cells spread across any geographic area, each with its own on-site RU 115.

RUs 115 support wireless communications with any number of user devices 141-143. UE 141-143 are often mobile phones or other portable devices that can move between different cells associated with the different RUs 115, although 5G networks are also widely expected to support home and office computing, industrial computing, robotics, Internet-of-Things (IoT), and many other devices. While the example illustrated in FIG. 1 shows one RU 115 for convenience, a practical implementation will typically have any number of virtualized RUs 115 that can each be individually configured to provide highly configurable geographic coverage for a host or guest network, if desired. Host 101 and guest operators 102, 103, 104 can automatically scale and manage network services with automatically managed user accounts using the techniques described herein.

Figure 2:
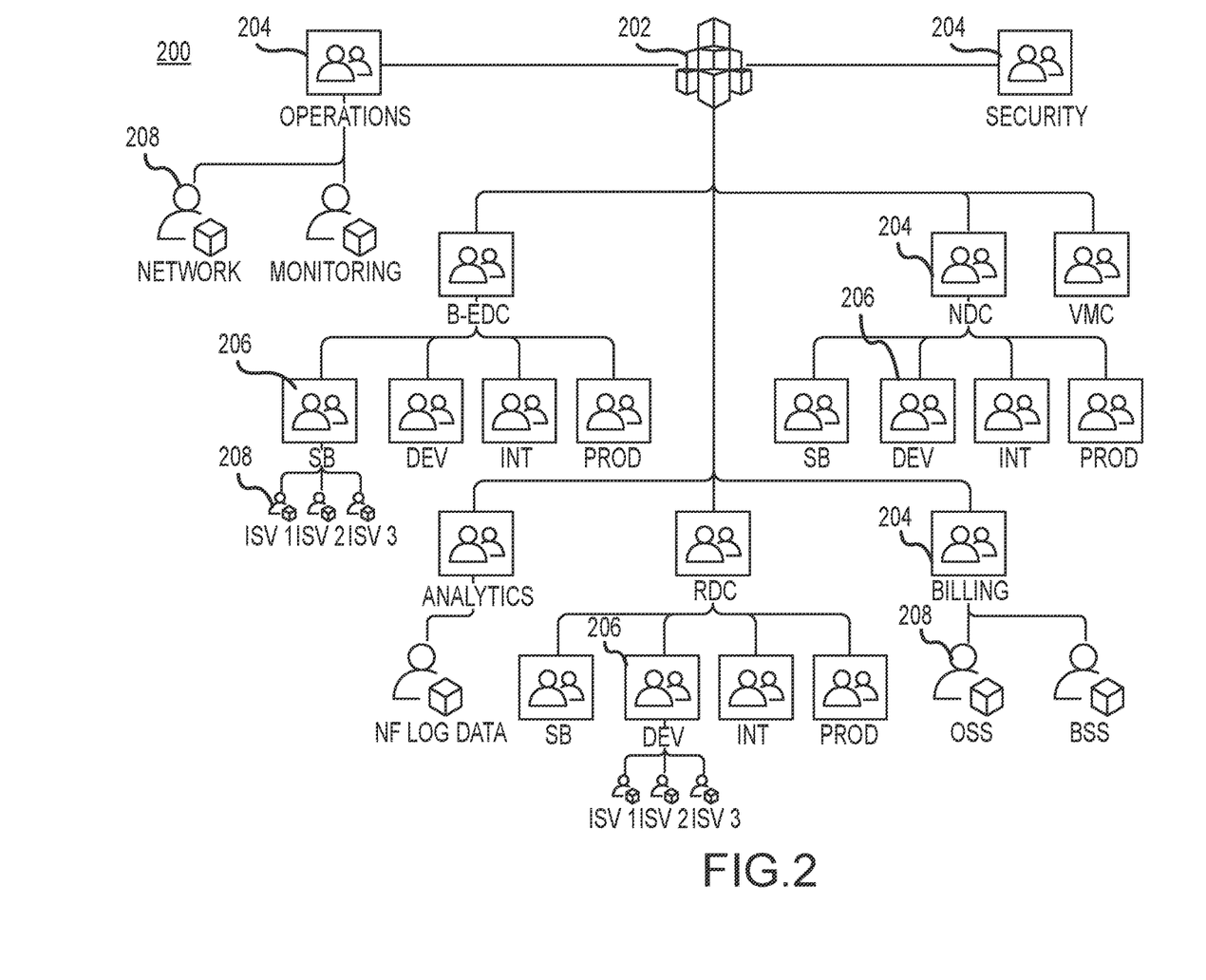
FIG. 2 illustrates an example of an organization structure implemented by an account provisioning system, in accordance with various embodiments.

Referring now to FIG. 2, group hierarchy 200 for user accounts is shown for use in cellular communication system 100 of FIG. 1, in accordance with various embodiments. Group hierarchy 200 comprises a root level 202 positioned above top-level groups 204. Top-level groups 204 can include subgroups 206 or user accounts 208 as members. Membership in a top-level group 204 grants membership in subgroups 206 of the top-level group 204. The groups 204 and subgroups 206 have various permissions applied to them to control behavior of user accounts 208 belonging to the group.

Top-level groups 204 in the depicted example of hierarchy 200 include Operations, Security, B-EDC, NDC, VMC, RDC, Analytics, and Billing. As an example of inherited permissions, any permission granted to the top-level group 204 entitled Operations is granted to members of Operations, which include user accounts 208 entitled Network and Monitoring. Continuing the example, if the Operations group 204 is granted login permission for networking equipment, then both the network and monitoring user accounts would have the same login permissions for networking equipment.

Subgroups 206 enable further refinement of permissions relative to top-level groups 204. Subgroups 206 in the depicted example of FIG. 2 include sandbox (SB), development (Dev), Int, production (Prod.) Subgroups inherit the permissions granted to their parents and may have additional permissions that are not automatically distributed to the membership of the parent. During provisioning, user accounts 208 may be dropped into any group 204 or subgroup 206 as desired. The user accounts are automatically provisioned with the permissions of the group to which they belong using the techniques described herein. User accounts 208 may be exclusively members of a single group 204 or subgroup 206 in some embodiments. Examples of user accounts 208 in the depicted hierarchy 200 of FIG. 2 include isv 1, isv 2, isv 3, NF Log Data, OSS, and BSS.

Figure 3:
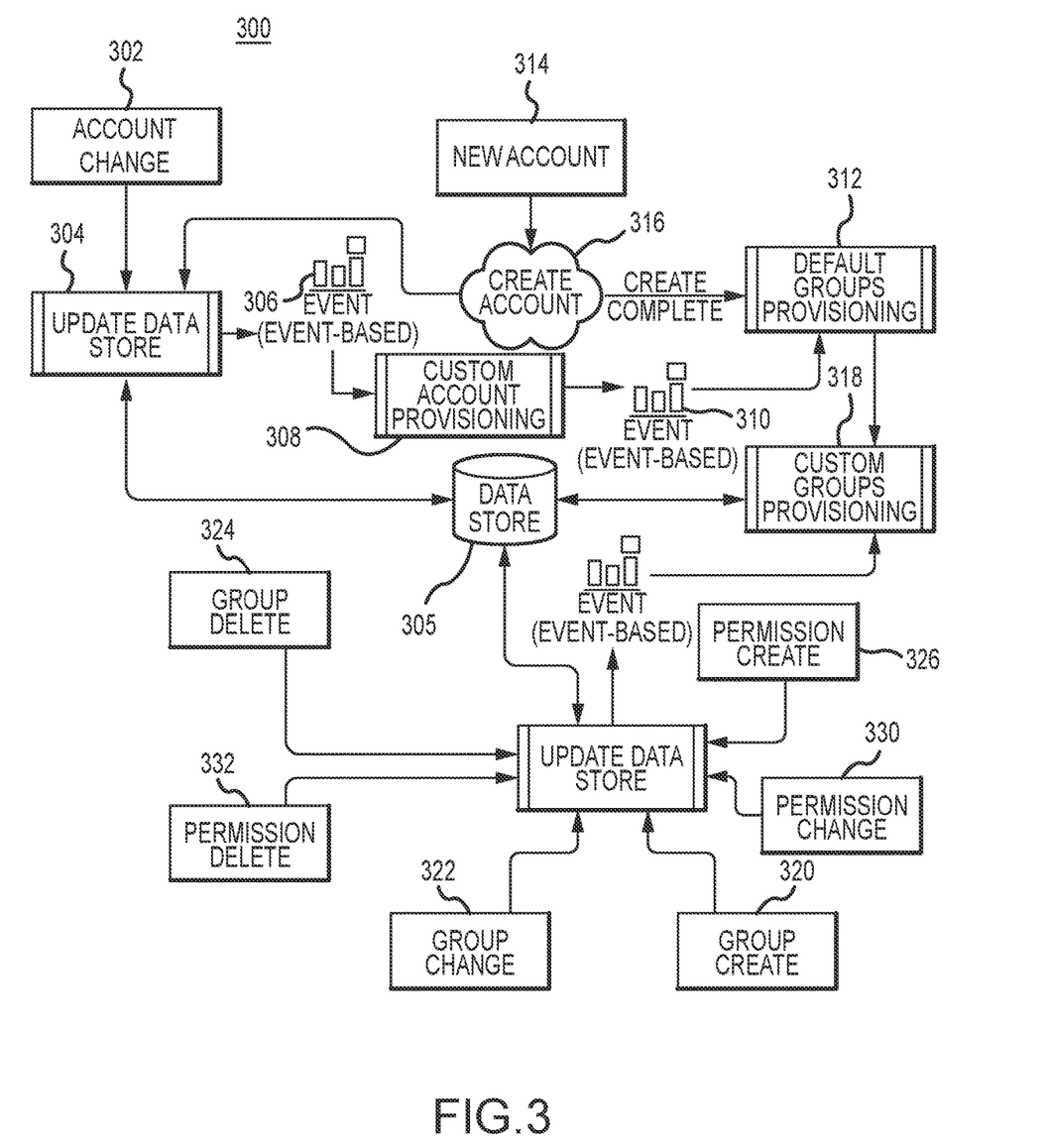
FIG. 3 illustrates an example system for modifying, creating, editing, or deleting user accounts, groups, or permissions to implement an organization structure, in accordance with various embodiments.

With reference now to FIG. 3, cloud-based system 300 is shown implementing the group hierarchy of FIG. 2, in accordance with various embodiments. By implementing group hierarchy 200, cloud-based system 300 enables layered enforcement of permissions through placement of user accounts in groups. Tagging may be used in support of the various levels and groups in implementing the permission hierarchy of FIG. 3 using an unstructured data store. A user account can be moved into different groups, and permissions can be automatically updated for the account to reflect membership in the new group after the account is moved.

System 300 responds to events to manage permissions for user groups 204, subgroups 206, and user accounts 208. System 300 detects an event triggering an account change (Block 302). Examples of events triggering an account change include a manual request to change permissions for a user account, an automated request to change permissions for a user account, a request to delete a user account, or other suitable events. A triggering event may include moving user account 208 into a different group 204 or subgroup 206 in hierarchy 200. System 300 writes updates to the data store that maintains account data to make the requested change or to make a predetermined change in response to the triggering event.

In various embodiments, triggering event 306 may cause system 300 to update the data store (Block 304) and perform custom account provisioning (Block 308). An event triggering new account creation (Block 314) may cause system 300 to create an account (Block 316) in the cloud environment. Custom account provisioning may include granting permissions to a user account 208 without granting permissions to a subgroup 206 or top-level group 204 above the user account. Triggering event 310 may cause system 300 to perform default group provisioning based on hierarchy 200 (Block 312). A user account 208 is granted default permissions in response to the location of user account 208 in hierarchy 200 using techniques described herein. In some embodiments, all accounts in an organization may be granted default baseline permissions referred to as birthright access.

In various embodiments, data store 305 is updated to store the account permissions provisioned using cloud-based system 300. Data store 305 may be an unstructured data store or any other data structure suitable for storing permissions in a cloud-based environment. Various embodiments update data store 305 using an API call or other interface enabling system 300 to modify cloud-based permissions settings. For example, some embodiments use the cloud-based Control Tower tools hosted by AWS to modify data store 305.

System 300 performs custom group provisioning (Block 318), in accordance with various embodiments. Custom group provisioning sets account permissions based on the location of user account 208 in hierarchy 200. Hierarchy 200 can be modified by creating, modifying, and deleting groups using techniques described herein, and hierarchy 200 can also be modified by creating, modifying, and deleting permissions. Events that trigger group and account provisioning can include, for example, permission creation 326, permission change 330, or permission delete 332 operations applied to a target permission group. Events that trigger group or account provisioning can also include group creation 320, group change 322, or group delete 324 operations applied to a target permission group.

Figure 4:
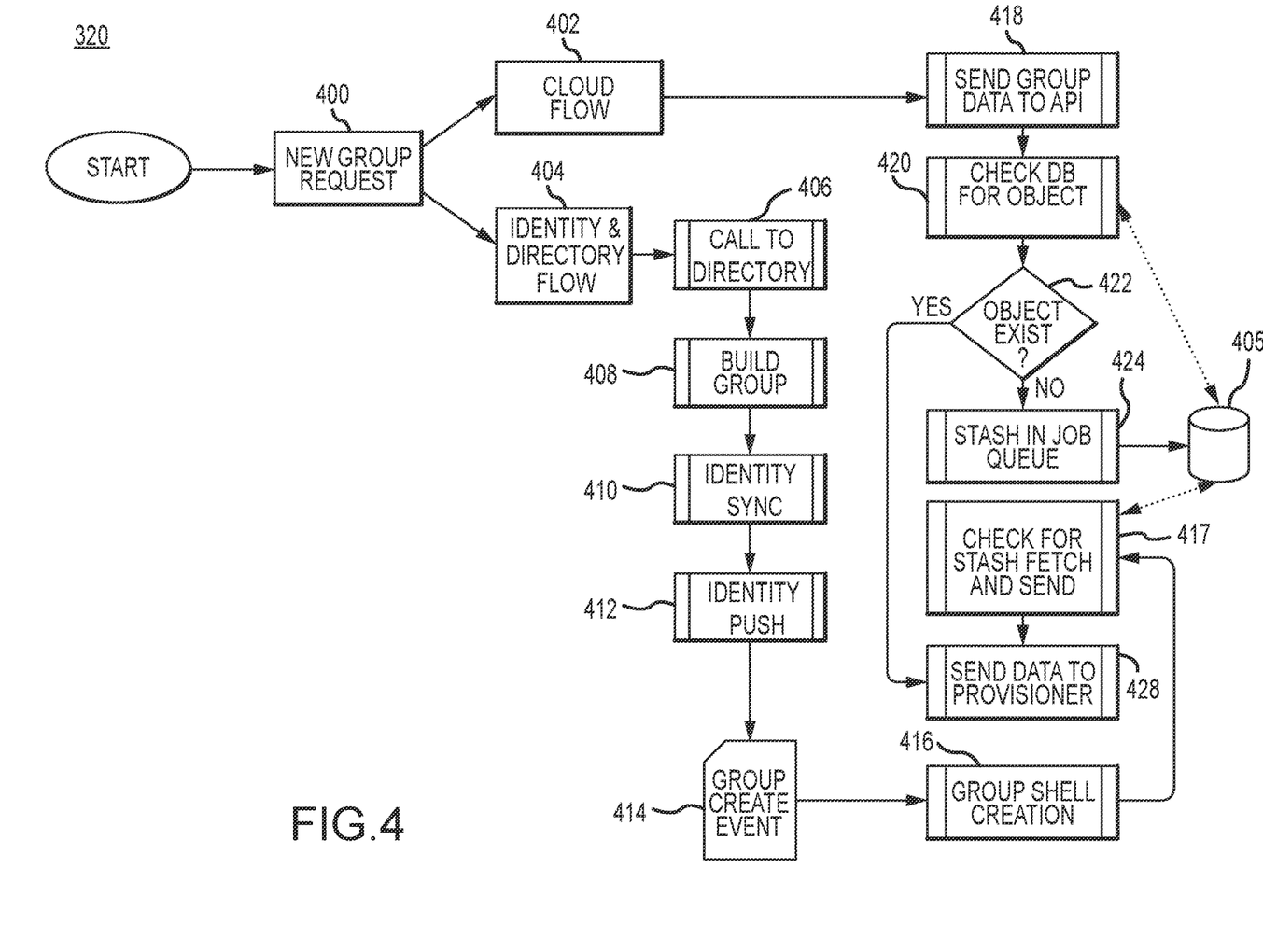
FIG. 4 illustrates a process for creating a new permission group, in accordance with various embodiments.

Referring now to FIG. 4 with continuing reference to FIGS. 2 and 3, process 320 for creating a new group 204 or subgroup 206 is shown, in accordance with various embodiments. Process 320 begins with a new group request (Block 400). The new group request triggers an identity management branch (Block 404) and a cloud management branch (Block 402). In the example depicted in FIG. 4, identity management branch 404 includes identity management software such as, for example, Okta and Active Directory, respectively. Other embodiments may use other identity or directory management tools that are nonnative to the cloud environment. Process 320 includes making an API call to a directory system (Block 406). Process 320 builds the group using the directory system (Block 408). Process 320 also syncs with an identity management platform (Block 410) and pushes identity data (Block 412) out to trigger a group creation event for the cloud environment.

In various embodiments, process 320 launches a group create event (Block 414). Process 320 creates a group shell in response to the group create event (Block 416). System 300 may then check for stash fetch in response to creation of the group shell (Block 417). The stash serves to maintain alignment between identity management branch of block 404 and the cloud management branch of block 402. In that regard, the stash and fetch steps of process 320 serve as a locking mechanism, though other locking mechanisms such as mutex, a flag, a variable, or other locking mechanism could be used in various embodiments.

In various embodiments, the cloud management branch of block 402 sends group data to the cloud platform (Block 418). Data can be sent to the cloud platform by API or function calls. Data may also be sent to the cloud platform in a flat file or data stream for ingestion. Cloud management process may trigger a workflow to launch a command to check a database (Block 420). The cloud management process checks whether the group object is created in the cloud platform (Block 422).

In various embodiments, the cloud management branch stashes the update in a job queue in response to the group object not yet being created in the identity management workflow (Block 424). The job queue thus locks process 320 until the cloud management branch 402 and identity management branch 404 are both ready to advance. The job queue can be stored in data store 405. In response to a job being stashed in the queue, process 320 sends data to a provisioner (Block 428). Process 400 may wait until a job is in queue in response to the queue being empty.

Figure 5:
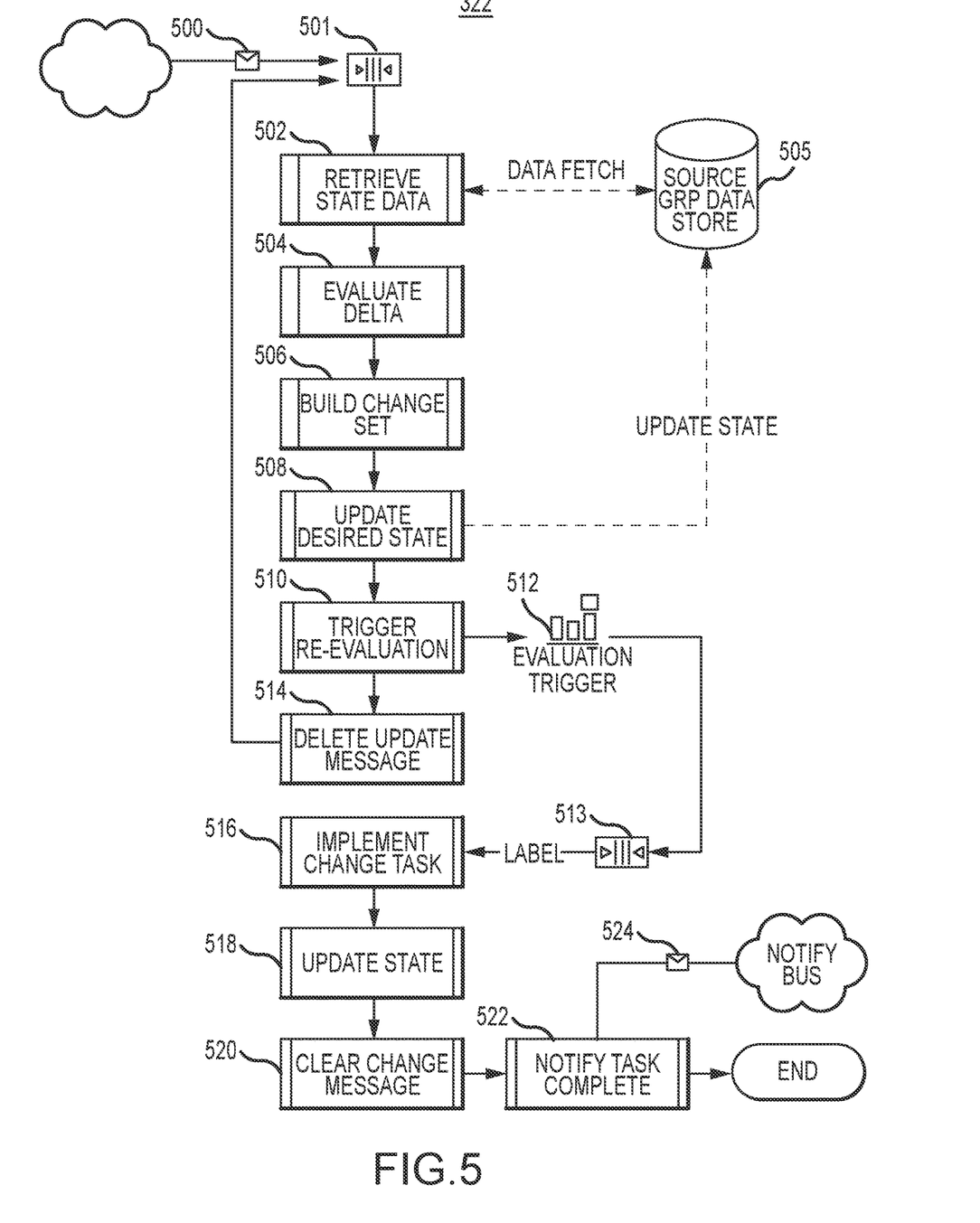
FIG. 5 illustrates a process for changing permissions assigned to a permission group, in accordance with various embodiments.

Referring now to FIG. 5 with continuing reference to FIGS. 2 and 3, process 322 for modifying group 204 or subgroup 206 is shown, in accordance with various embodiments. Process 322 may begin by receiving a task to update a group in task queue 501. Process 322 retrieves state data from group data store 505 (Block 502). State data can be retrieved using a query, an API request, a function, or other techniques for reading data from data store 505. Process 322 evaluates the retrieved data to identify changes suitable to implement the group update requested in message 500 (Block 504).

In various embodiments, a change set is built in response to the evaluated group data and the requested group update from message 500 (Block 506). The change set may include commands to create, modify, or delete permissions available to group 204 or subgroup 206. The change set is a set of steps that, when taken, modify existing group permissions in accordance with the change request in message 500. The change set is implemented or executed to update the group to the desired state identified in message 500 (Block 508). The updated group data is written to group data store 505.

Various embodiments of process 322 include reevaluation of the group triggered in response to the update (Block 510). Evaluation trigger 512 triggers the change task. The message requesting a group update may be deleted in response to triggering reevaluation (Block 514). A change task may be written to message queue 513 in response to evaluation trigger 512. The change task can include permission changes to be applied to members of the group identified in message 500.

Process 322 implements the change task (Block 516) and updates the data store (Block 518) with current state in various embodiments. The change message is cleared from message queue 513 in response to updating the data store (Block 520). The process may send notification message 524 to a notification bus to indicate the task is complete (Block 522).

Figure 6:
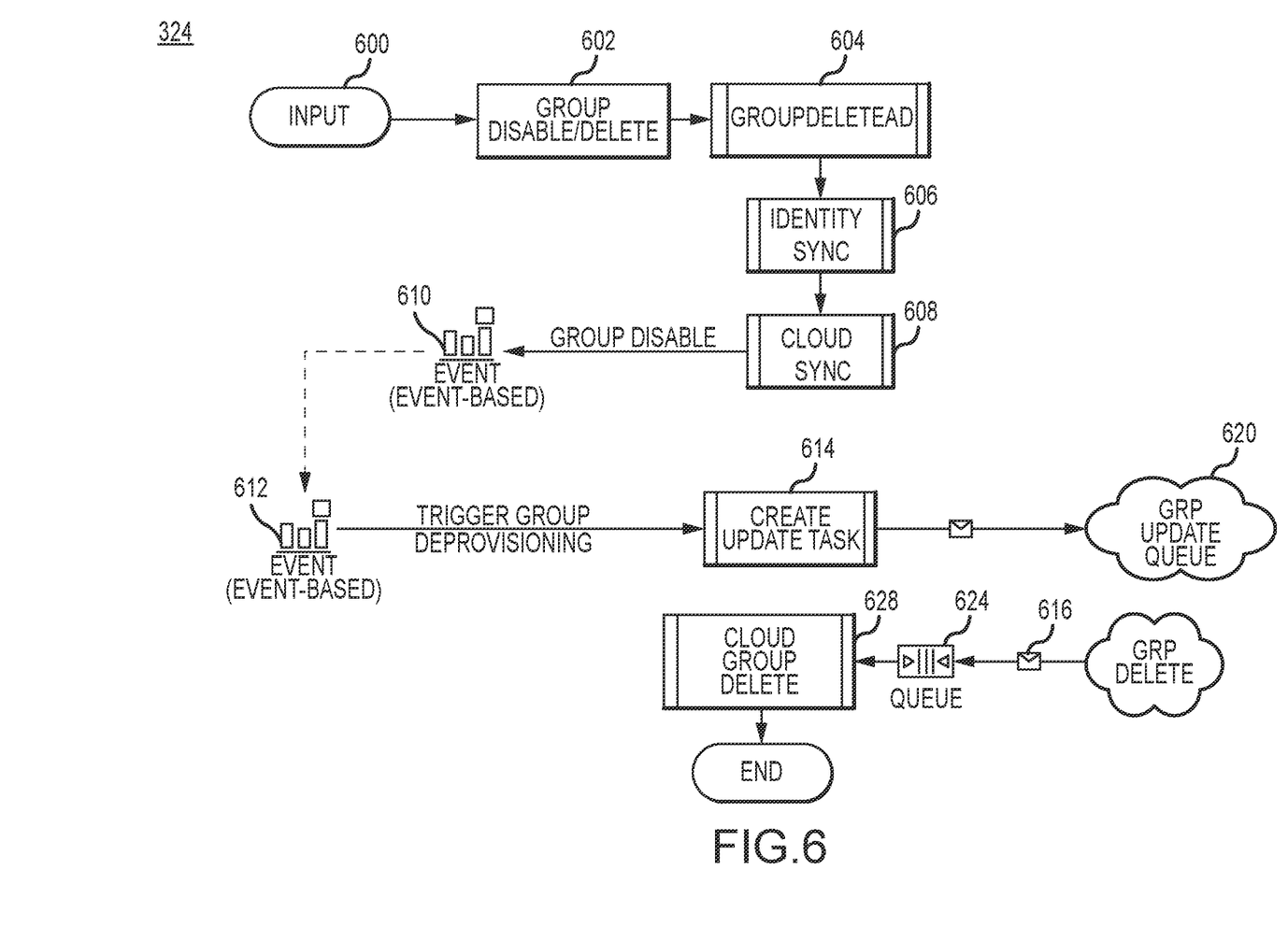
FIG. 6 illustrates a process for deleting a permission group, in accordance with various embodiments.

With reference to FIG. 6 and continuing reference to FIGS. 2 and 3, process 324 is shown for execution by system 300 to delete or disable a permission group 204 or subgroup 206, in accordance with various embodiments. Process 324 receives a request 602 to disable or delete a group as input 600. System 300 deletes the group from a directory system (Block 604). System 300 updates an identity management platform to synchronize with the directory system (Block 606). System 300 then disables the group in the cloud platform (Block 608) to synchronize the cloud platform with the identity management system. Group deletion data can be sent to the cloud platform by API or function calls. Data may also be sent to the cloud platform in a flat file or data stream for ingestion. System 300 triggers event 610 in response to disabling the group in the cloud platform. A triggering event 612 causes group deprovisioning on the cloud platform. Groups are deprovisioned by launching a permissions update task (Block 614). The update task sends a group delete message 616 to group update queue (Block 620). System 300 pulls group delete message 616 from message queue 624. In response to group delete message 616, system 300 deletes the requested group from the cloud platform (Block 628). Process 324 thus tends to synchronize a cloud platform with an identity management system and a directory system in response to deleting a permission group.

Figure 7:
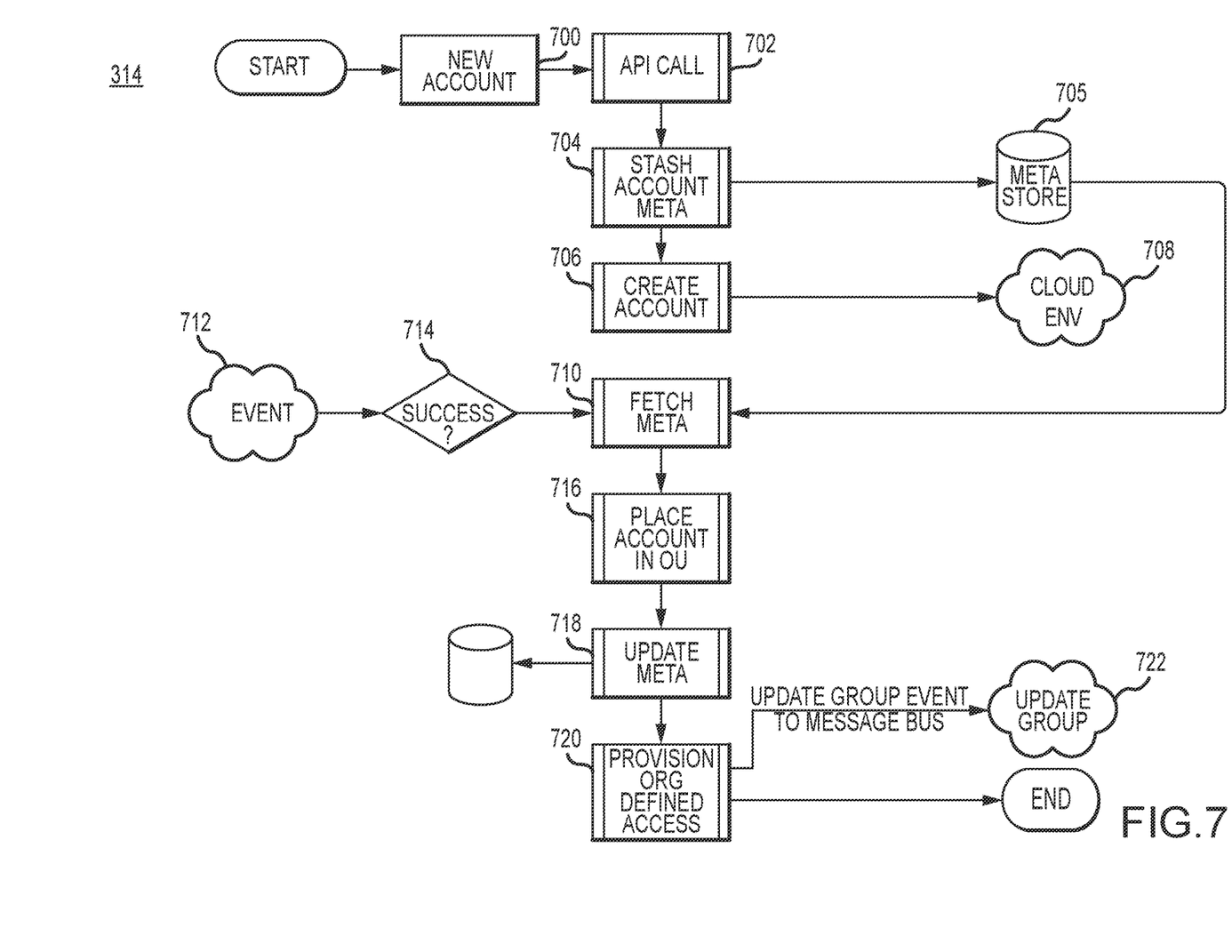
FIG. 7 illustrates a process for creating a user account, in accordance with various embodiments.

Referring now to FIG. 7, an example of a process 314 for creating a new account is shown. Process 314 can begin in response to a request 700 to create a new user account 208 (FIG. 2). Process 314 can include receiving an API call or other request to create a new user account 208 (Block 702). Metadata for the new account is stored in metadata store 705 (Block 704). The requested user account 208 is created (Block 706) in cloud environment 708.

In various embodiments, system 300 (FIG. 3) retrieves account metadata from metadata store 705 (Block 710). In response to successfully creating the requested account 208 (Block 714) in cloud environment 708 to trigger event 712, the account is placed in the appropriate organizational unit of the identity management system and directory system (Block 716). The metadata store 705 is updated to reflect account creation in the cloud platform, identity management system, and directory system (Block 718). In Block 720, new account 208 is provisioned with access as defined by its position in the organization (e.g., hierarchy 200 of FIG. 2) in the identity management system, the directory management system, or the cloud environment. The group is updated on the cloud platform to include the new user account 208 (Block 722).

Figure 8:
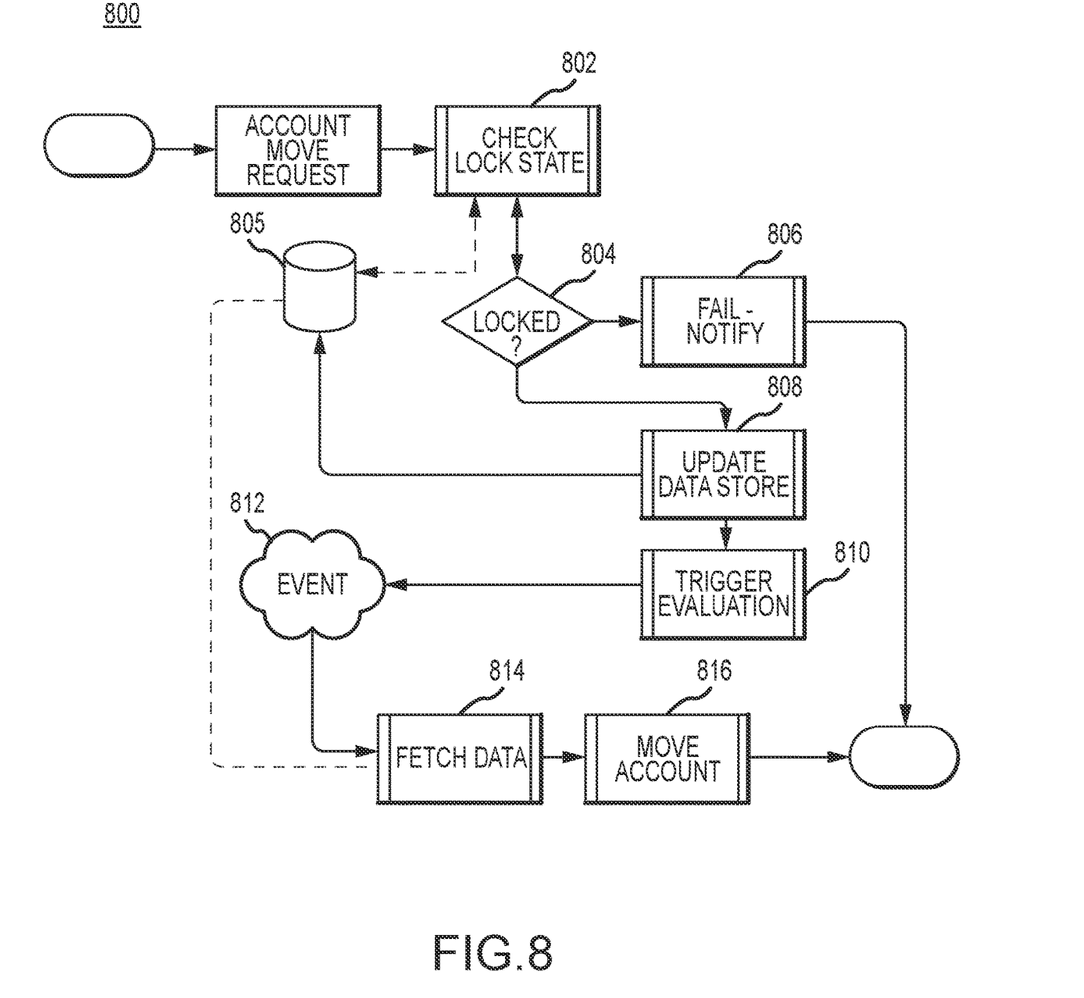
FIG. 8 illustrates a process for moving a user account, in accordance with various embodiments.

Referring now to FIG. 8 with continuing reference to FIG. 2, an example process 800 is shown for moving user account 208 between groups 204 and subgroups 206. The account move of process 800 is a type of account change 302 (of FIG. 3). System 300 (of FIG. 3) can launch process 800 in response to a request to move an account from one group to another. The system retrieves lock state data (Block 802) and checks whether the account is locked (Block 804). In response to the account being locked, the process terminates with a failure notification (Block 806). In response to the account being unlocked, system 300 updates data store 805 with the new account location for provisioning (Block 808).

Various embodiments trigger evaluation of the account (Block 810) in response to an event 812. Triggering events can be time-based or action-based. For example, account evaluation can be triggered by a regularly recurring process or job (e.g., a cron job). Account reevaluation can be triggered in response to a data store update or in response to an update message placed in a message queue. System 300 can fetch the existing account data and desired account state from data store 805 (Block 814). User account 208 is moved into a new group 204 or subgroup 206 in response to the data from data store 805 (Block 816).

Figure 9:
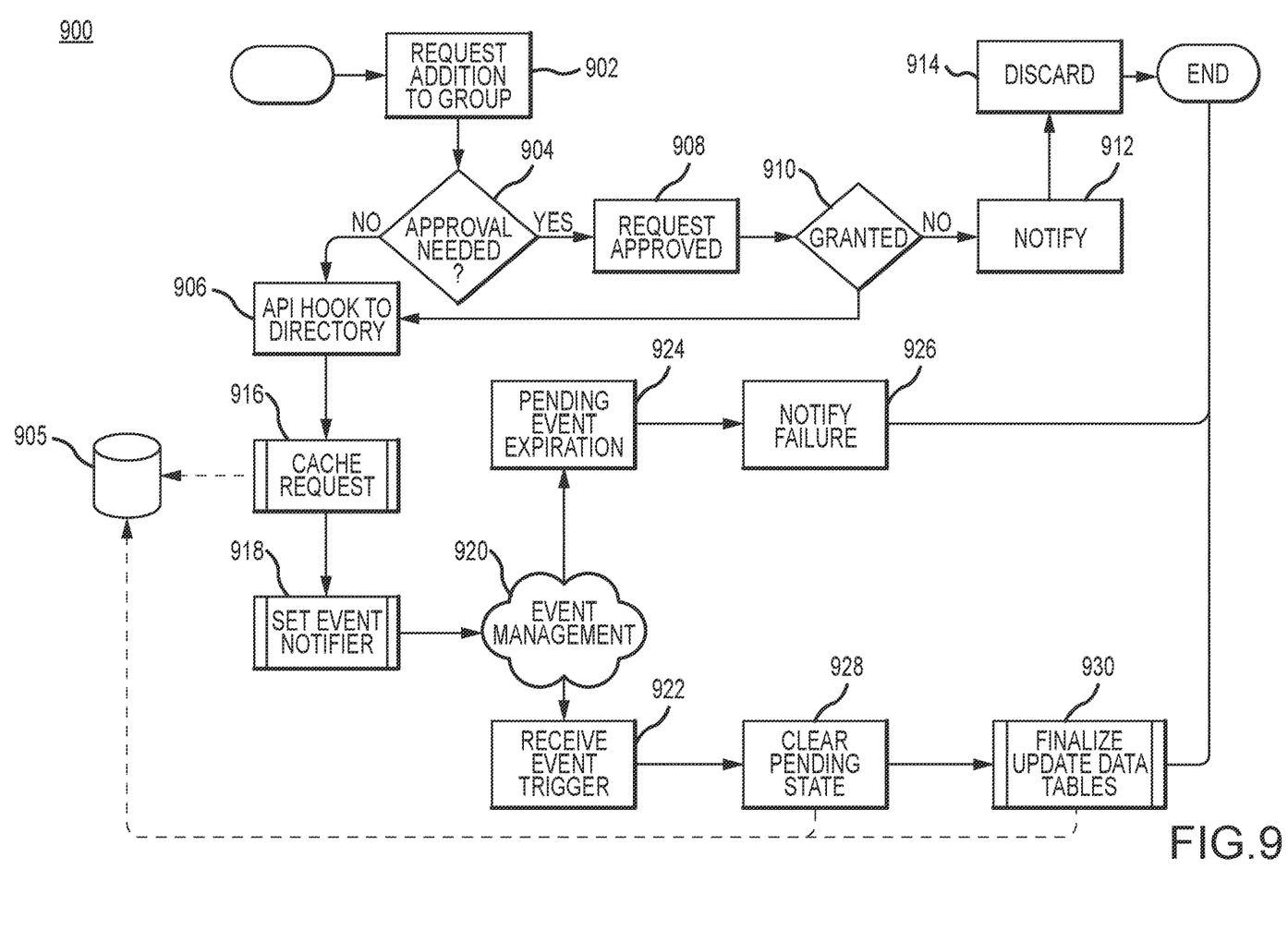
FIG. 9 illustrates a process for adding a user account to a group, in accordance with various embodiments.

Referring now to FIG. 9, an example process 900 is shown for adding a permission to a group 204 or subgroup 206. Process 900 may be implemented as a permission change 330 (of FIG. 3). Process 900 can launch in response to a request to add a permission to a group (Block 902). System 300 may check whether the group has an approval step for the requested permission (Block 904). If the update includes an approval step, system 300 may request approval (Block 908). An API hook may be used to add the permission to the group in the directory system or identity management system in response to advancing without approval (Block 906) or in response to approval being granted (Block 910). Process 900 may notify the requestor that the addition to group 204 or subgroup 206 was not approved (Block 912) and may discard the requested change (Block 914) in response to approval being denied.

In various embodiments, a cache request is made for data store 905 (Block 916). The cache request may send data to data store 905 to set the requested group addition in a pending state (Block 916). An event notifier may be set (Block 918) in an event management system 920. A pending event may expire before it is implemented (Block 924) in response to a predetermined time passing without successful implementation. System 300 may send a failure notification (Block 926) and terminate process 900 in response to the update expiring.

In various embodiments, an event trigger may cause system 300 to provision the requested group addition (Block 922). System 300 may clear the pending state of the requested group addition in data store 905 (Block 928). System 300 may then finalize the updates to data tables to reflect the requested group addition (Block 930). The new permission can then by added to each account that is a member of the group.

Figure 10:
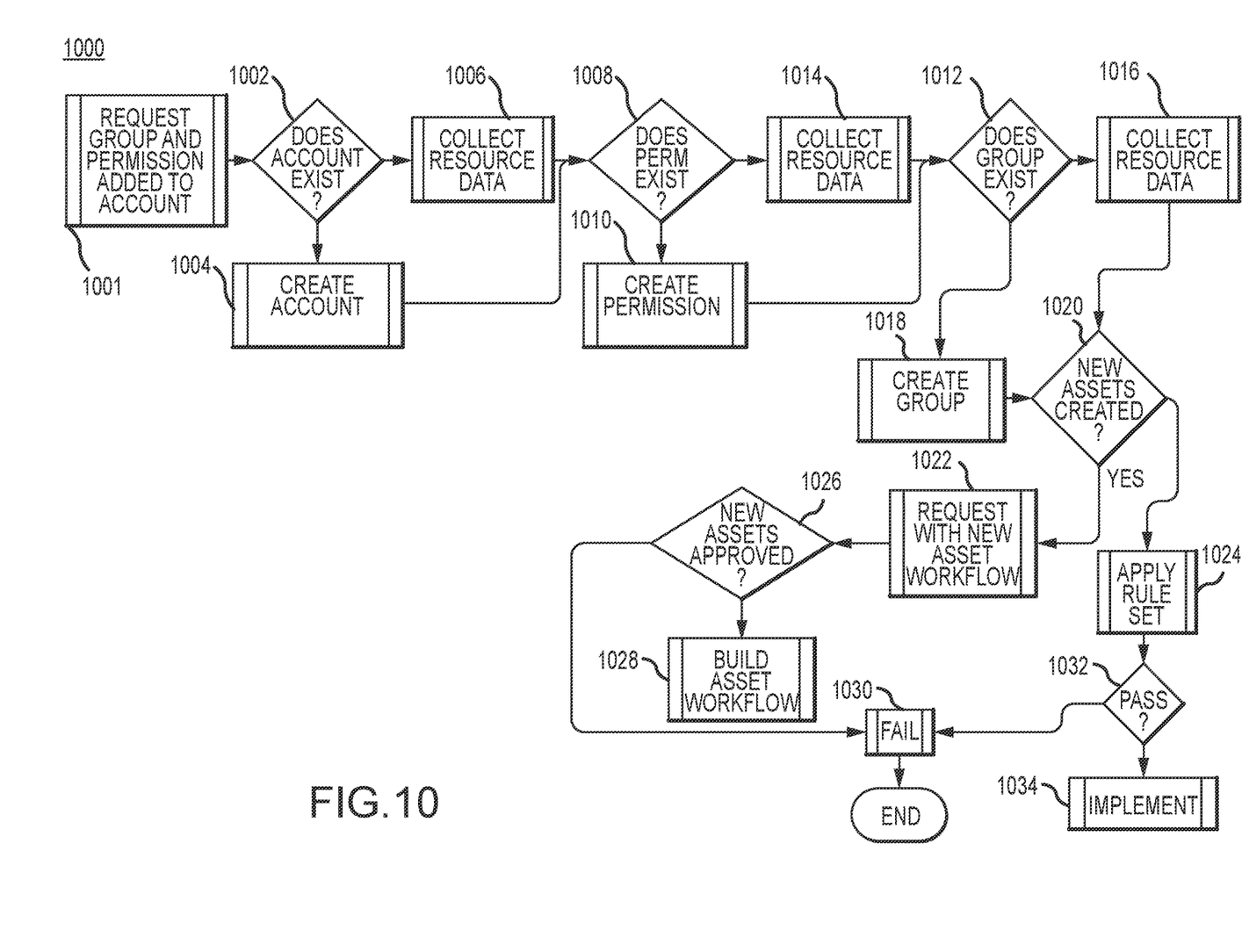
FIG. 10 illustrates a process for implementing a request to add a permission or a group to an account, in accordance with various embodiments.

Referring now to FIG. 10, an example process 1000 is shown for adding a group 204 or subgroup 206 and permissions to a user account 208. Process 1000 can begin with a request for a group and permission to be added to user account 208 (Block 1001). System 300 checks whether an account exists (Block 1002). The account is created in response to the account not existing (Block 1004). The account can be created by launching account creation process 314 (of FIG. 2). Account resource data can be collected in response to the account previously existing (Block 1006).

In various embodiments, system 300 checks whether the requested permission exists (Block 1008). If the requested permission does not exist, system 300 launches a create permission workflow 326 (Block 1010). Resource data is collected in response to the permission previously existing (Block 1014). System 300 checks whether the requested group exists (Block 1012). A new group process 320 (of FIG. 3) is launched in response to the group not previously existing. Resource data for the group is collected in response to the group previously existing (Block 1016). The new group process can be triggered in response to the group not existing (Block 1018). System 300 can check whether the account, permission, or group (collectively, new assets) have been created (Block 1020). In response to new assets not being created, process 1000 can request new assets (Block 1022) including accounts, groups, subgroups, or permissions. If a new asset has been created, process 1000 can check whether the assets are approved (Block 1026). If one or more assets was not approved, process 1000 can fail and terminate (Block 1030).

In various embodiments, process 1000 can include building an asset workflow in response to new assets being approved (Block 1028). Rule sets are applied to check whether the new or existing assets are suitable for implementing the request (Block 1024). If the check fails, process 1000 can fail and terminate (Block 1032). If the check passes, process 1000 implements the requested change (Block 1034).

Systems and methods of the present disclosure can automate time-consuming birthright provisioning in a cloud-based environment based on an organizational hierarchy. A message queue can be used to maintain synchronization between an identify management service, a directory system, and cloud-based accounts and groups. Updates may be made to cloud-based accounts and groups one at a time in response to messages in the queue, and updates to the document and identity management systems can pause and wait for the completion of updates, additions, or deletions to accounts and groups in the cloud-based system.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment (for example, A and B, A and C, B and C, or A and B and C).

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process for managing groups in a cloud-based environment, comprising:
   receiving, by a processor, a request to create a permission group;
   building, by the processor, the permission group in a directory system, wherein the directory system is nonnative to the cloud-based environment;
   syncing, by the processor, the permission group from the directory system with an identity management system, wherein the identity management system is nonnative to the cloud-based environment;
   stashing, by the processor, a group creation job to a queue, wherein the group creation job is configured to create the group in the cloud-based environment; and
   provisioning, by the processor, the permission group in response to consuming the group creation job from the queue.

2. The automated process of claim 1, further comprising:
   receiving a second request to create a second permission group; and
   provisioning, by the processor, the second permission group in response to the second permission group existing in the cloud-based environment before receiving the second request.

3. The automated process of claim 1, further comprising:
   receiving a request to update the permission group;
   storing a new state of the permission group in a data store;
   sending a message to a message queue indicating the new state of the permission group is in the data store; and
   updating the permission group to the new state in response to consuming the message from the message queue.

4. The automated process of claim 1, further comprising:
   receiving a request to delete the permission group;
   deleting the permission group from the directory system;
   syncing the deletion of the permission group to the identity management system;
   writing a message to a queue to delete the permission group on the cloud-based environment; and
   deleting the permission group from the cloud-based environment in response to consuming the message from the queue.

5. The automated process of claim 1, further comprising provisioning an account with permissions assigned to the permission group in response to placing the account in the permission group.

6. The automated process of claim 5, further comprising deprovisioning old permissions associated with an old permission group from the account in response to the account being removed from the permission group.

7. The automated process of claim 1, further comprising:
   updating an account in the identity management system in response to the account being placed in the permission group;
   storing permission data in a data store in response to the update in the identity management system; and
   moving the account in the cloud-based environment using the permission data read from the data store.

8. The automated process of claim 1, further comprising:
   requesting an approval to add a permission to the permission group;
   updating the directory system to add the permission to the permission group in response to receiving the approval; and
   writing permission data and group data to a data store to update the cloud-based environment.

9. The automated process of claim 8, wherein the permission enables access to a virtual distributed unit of a telephone network on the cloud-based environment.

10. An automated process for managing groups, comprising:
    building, by a processor, a permission group in a directory system;
    syncing, by the processor, the permission group from the directory system with an identity management system;
    stashing, by the processor, a group creation job to a queue; and
    provisioning, by the processor, the permission group in a telephone network on a cloud-based environment in response to consuming the group creation job from the queue, wherein the directory system is nonnative to the cloud-based environment, wherein the identity management system is nonnative to the cloud-based environment.

11. The automated process of claim 10, further comprising:
receiving a second request to create a second permission group; and
provisioning, by the processor, the second permission group in response to the second permission group existing in the cloud-based environment before receiving the second request.

12. The automated process of claim 10, further comprising:
receiving a request to update the permission group;
storing a new state of the permission group in a data store;
sending a message to a message queue indicating the new state of the permission group is in the data store; and
updating the permission group to the new state in response to consuming the message from the message queue.

13. The automated process of claim 10, further comprising:
receiving a request to delete the permission group;
deleting the permission group from the directory system;
syncing the deletion of the permission group to the identity management system;
writing a message to a queue to delete the permission group on the cloud-based environment; and
deleting the permission group from the cloud-based environment in response to consuming the message from the queue.

14. The automated process of claim 10, further comprising provisioning an account with permissions assigned to the permission group in response to placing the account in the permission group.

15. The automated process of claim 14, further comprising deprovisioning old permissions associated with an old permission group from the account in response to the account being removed from the permission group.

16. The automated process of claim 10, further comprising:
updating an account in the identity management system in response to the account being placed in the permission group;
storing permission data in a data store in response to the update in the identity management system; and
moving the account in the cloud-based environment using the permission data read from the data store.

17. The automated process of claim 10, further comprising:
requesting an approval to add a permission to the permission group;
updating the directory system to add the permission to the permission group in response to receiving the approval; and
writing permission data and group data to a data store to update the cloud-based environment.

18. The automated process of claim 17, wherein the permission enables access to a virtual central unit of a telephone network on the cloud-based environment.

19. The automated process of claim 17, wherein the permission enables access to a radio unit in communication with a telephone network running on the cloud-based environment.

20. A permission management system for a cloud-based telephone network comprising a processor and a non-transitory memory in communication with the processor and configured to store instructions that, when executed by the processor, cause the permission management system to perform operations, the operations comprising:
building, by a processor, a permission group in a directory system;
syncing, by the processor, the permission group from the directory system with an identity management system;
stashing, by the processor, a group creation job to a queue; and
provisioning, by the processor, the permission group in a telephone network on a cloud-based environment in response to consuming the group creation job from the queue, wherein the directory system is nonnative to the cloud-based environment, wherein the identity management system is nonnative to the cloud-based environment.

* * * * *